United States Patent [19]

Beaubien et al.

[11] Patent Number: 5,331,168
[45] Date of Patent: Jul. 19, 1994

[54] REFERENCE GRADE SOLAR ULTRAVIOLET BAND PYRANOMETER

[76] Inventors: David J. Beaubien, 101 Industrial Rd., Box 746, Turners Falls, Mass. 01376; Arthur F. Beaubien, 12 N. Taylor Hill Rd., Montague, Mass. 01351

[21] Appl. No.: 838,601

[22] Filed: Feb. 19, 1992

[51] Int. Cl.⁵ .................................. G01J 5/02
[52] U.S. Cl. ........................... 250/372; 250/365; 250/461.1
[58] Field of Search ............. 250/361 R, 365, 372, 250/458.1, 461.1, 352, 483.1, 486.1

[56] References Cited

U.S. PATENT DOCUMENTS

| | | | |
|---|---|---|---|
| 3,838,282 | 9/1974 | Harris | 250/372 |
| 3,891,849 | 6/1975 | Felice et al. | 250/372 |
| 4,010,372 | 3/1977 | Adler et al. | 250/372 |
| 4,472,635 | 9/1984 | Yokota et al. | 250/486.1 |
| 4,486,486 | 12/1984 | Maeoka et al. | 250/486.1 X |
| 4,825,078 | 4/1989 | Huber et al. | 250/372 |
| 4,851,685 | 7/1989 | Dübgen | 250/372 |
| 4,882,598 | 11/1989 | Wulf | 250/372 X |
| 4,891,527 | 1/1990 | Rabatin | 250/486.1 X |
| 4,914,303 | 4/1990 | Knuepfer | 250/483.1 |
| 4,935,631 | 6/1990 | Moslem et al. | 250/372 |
| 5,036,311 | 7/1991 | Moran et al. | 250/372 X |
| 5,107,123 | 4/1992 | Shi | 250/372 |

*Primary Examiner*—Constantine Hannaher
*Assistant Examiner*—Edward J. Glick

[57] ABSTRACT

A low-cost, reference grade pyranometer responsive to radiation in a band such as ultraviolet-B embodies unexpected and efficient construction. Large arrays or other multisensor systems are consequently available to a greater range of users. A dome constructed of UV-transmissive material has mounted therein a UV-pass "black glass" filter which transmits UV-B to a phosphor layer. The phosphor absorbs UV-B and re-emits it as predominantly green visible light. A green filter, which is "solar blind," i.e. non-transmissive to reds in the solar spectrum, transmits light to a solid state photodiode. The solid state photodiode has peak sensitivity in the green portion of the spectrum and rejects substantially all red leakage. Critical parameters such as the density and thickness of the phosphor and temperature compensation of the pyranometer combine to provide for a simplified pyranometer having great precision in measuring bands such as UV-B compared to the prior art.

18 Claims, 6 Drawing Sheets

REFERENCE GRADE SOLAR ULTRAVIOLET BAND PYRANOMETER

BACKGROUND OF THE INVENTION

The present invention relates to ultraviolet radiation measuring means responsive to radiation in a selected ultraviolet band, and more particularly to a pyranometer for measuring ultraviolet-B in solar radiation.

Measurement of solar radiation may be made within particular bands with the ultraviolet spectrum, such as ultraviolet-A or ultraviolet-B. Measurement of solar ultraviolet-B radiation is a distinguishable endeavor from ultraviolet radiation measurement in general. Ultraviolet-B radiation, also referred to in the art as UV-B, is the radiation in the range of 280-320 nm. It is this portion of the UV spectrum that is associated with erythmal damage, for example sunburn. Prior art monitors for measuring outputs of ultraviolet lamps are, of course, well-known. They will have some utility in measuring ultraviolet radiation. However, the solar spectrum differs from that produced by common prior art electrical ultraviolet radiation sources.

It is for this reason that the present invention is characterized as a pyranometer rather than broadly as ultraviolet measuring apparatus. The "pyra" root refers to early forms of such apparatus in which heating on blackened metal strips due to solar radiation was measured. The present invention will provide for accuracy of UV-B measurement in ways not contemplated in the design of apparatus for measuring the output of artificial sources. The monitors for electrical sources do not address concerns uniquely associated with precise measurement of solar UV-B.

In accordance with the present invention, it is desired to provide a reference grade instrument useful for measurement of environmental UV-B, or other ultraviolet band such as UV-A. The need for measurement of UV-C with the present invention is not contemplated to be as great, Reference grade instruments are well-known in the art. However, as described below, there are significant applications of pyranometers that require their use in large numbers. Embodying such an instrument in a relatively low-cost form greatly increases its accessibility to users.

Measurement of solar UV-B is an important concern due to the scientific and environmental issues concerning depletion of the earth's stratospheric ozone layer. Stratospheric ozone attenuates UV-B. There is concern that people on the earth's surface will be exposed to undue risks of erythmal damage due to increased exposure to UV-B resulting from depletion of the ozone layer. Substantial depletions of the Antarctic stratospheric ozone layer was documented in J. C. Farman, B. G. Gardiner and J. D. Shanklin: Large losses of total ozone in Antarctica reveal seasonal $ClO_x/NO_x$ interaction. Nature, 315(6016), 207-210, (1985). In M. Blumenthaler and W. Ambach: Measurements of the temperature coefficient of the Robertson-Berger sunburn meters and the Eppley UV Radiometer. Arch. Meteorol. Geophys. Bioclim., B36, 357-363, (1986), it is reported that UV-B flux has increased about 1% per year in the Swiss Alps. Consequently, there is a need for global monitoring of ultraviolet radiation levels in solar radiation reaching the earth's surface.

Measurement of UV-B flux due to solar radiation in urban areas is difficult due to presence of UV-B absorbers such as aerosols and pollution-caused ozone in the troposphere. Consequently, there is a need for establishment of an improved measuring technology and for an efficiently produced apparatus suitable for use in widespread UV-B monitoring networks. Existence of large-scale, geographically extensive networks is a prerequisite for establishing a complete and accurate UV-B climatology of the earth.

Measurement of solar UV-B can be done with primary spectroradiometers, which serve as reference instruments and provide baseline data. However, their expense and complexity makes them impractical for widespread use. Conventional secondary optical detection schemes, e.g. silicon detectors, are not really suited to this task since the amount of energy present in the ultraviolet-B spectrum is only a small fraction of the total amount of energy available in the visible portion of the spectrum. Rejection of response to visible portions of the spectrum is very important. Even if a detector converts only a very small percentage of visible radiation into a signal supposedly indicative of UV-B, its utility for indicating slight increases in UV-B flux over a period of time will be totally compromised.

Current ultraviolet-B radiation detectors are further embodiments of a scheme for detecting UV-B described in D. F. Robertson: Solar ultraviolet radiation in relation to human sunburn and skin cancer. Ph.D. thesis, University of Queensland, Australia, (1972). This basic for of measurement was improved by Berger, as described in, D.S. Berger: The sunburning ultraviolet meter: design and performance. Photochem. Photobiol., 24, 587-593 (1976). Present versions of these instruments are often referred to as Robertson-Berger meters, or R-B meters.

In the general scheme of an R-B meter, radiation is directed to a phosphor which is excited by UV-B and re-emits at another wavelength. In this manner, a detector can be used which is nominally insensitive to red visible radiation, and response to UV-B is provided while visible radiation is desired to be rejected. Robertson uses a photomultiplier to sense radiation intensity emitted by the phosphor. An updated version using a solid state radiation detector rather than a photomultiplier is disclosed in U.S. Pat. No. 4,348,664 issued Sep. 7, 1982 and assigned to Elder pharmaceuticals. While this system is nominally insensitive to red radiation, it is utilized to measure the output of UV lamps to assure uniform dosage therefrom. However, this apparatus is not intended for use with the sun as a source. It would be imprecise for the reasons discussed above if used in the context of solar radiation. Gaseous ultraviolet lamps have a significantly lower "red" component in their output spectrum than solar radiation. Even a small fraction of the visible component of sunlight can contain more power than the UV-B component. Consequently, precision can be destroyed if even a small portion of the sunlight is not rejected. The apparatus as disclosed in the patent nominally rejects "red" response from an artificial source, but may not be operative to reject "red" at the levels received from solar radiation.

It is important to be able to provide a pyranometer for solar UV-B measurement since there is a need to perform solar measurement that is not addressed by instruments designed to monitor the output of UV lamps, and because it requires only a limited degree of imprecision in the output of the pyranometer to render it inoperative for meeting the objectives of the present invention.

SUMMARY OF THE INVENTION

It is therefore a general object of the present invention to provide a reference grade pyranometer particularly suited for use in measurement of UV-B in solar radiation.

It is another object of the present invention to provide a pyranometer of the type described which may be conveniently embodied to facilitate utilization of large arrays in multiple locations.

It is also an object of the present invention to provide a UV-B pyranometer substantially immune to sources of errors such as response to visible light and environmental temperature fluctuations.

It is a further object of the present invention to provide a pyranometer of the type described which includes means for improving accuracy which are not regarded by prior art teachings in the art to be necessary and which provides a level of precision having utility with respect to measurement of UV-B relevant to analysis of the level of ozone in the earth's atmosphere.

It is also a general object of the present invention to provide a reference grade pyranometer particularly suited for use in measurement of a selectable ultraviolet band in solar radiation such as UV-A or UV-B.

Briefly stated, in accordance with the present invention, there is provided a pyranometer suited for precise measurement of an ultraviolet band such as UV-A or UV-B in the environment. A dome constructed of UV-transmissive material has mounted therein a UV-pass "black glass" filter which transmits the band, for example, UV-B to a phosphor layer. The phosphor absorbs UV-B and re-emits it as predominantly green visible light. A green filter, which is "solar blind," i.e. non-transmissive to reds in the solar spectrum transmits green light to a GaAsP solid state photodiode, rather than a silicon photodiode. The photodiode has peak response to green and substantially rejects substantially all red light. Critical parameters, such as the density and thickness of the phosphor and temperature compensation of the pyranometer and detection spectrum matching at the photodiode level, combine to provide for a simplified pyranometer having great precision in measuring UV-B compared to the prior art.

BRIEF DESCRIPTION OF THE DRAWINGS

The means by which the foregoing objects and features of invention are achieved are pointed out with particularity in the claims forming the concluding portion of the specification. The invention, both as to its operation and manner of organization may be further understood by reference to the following description taken in connection with the following drawings.

Of the drawings.

DESCRIPTION OF THE PREFERRED EMBODIMENTS

Figure 1:
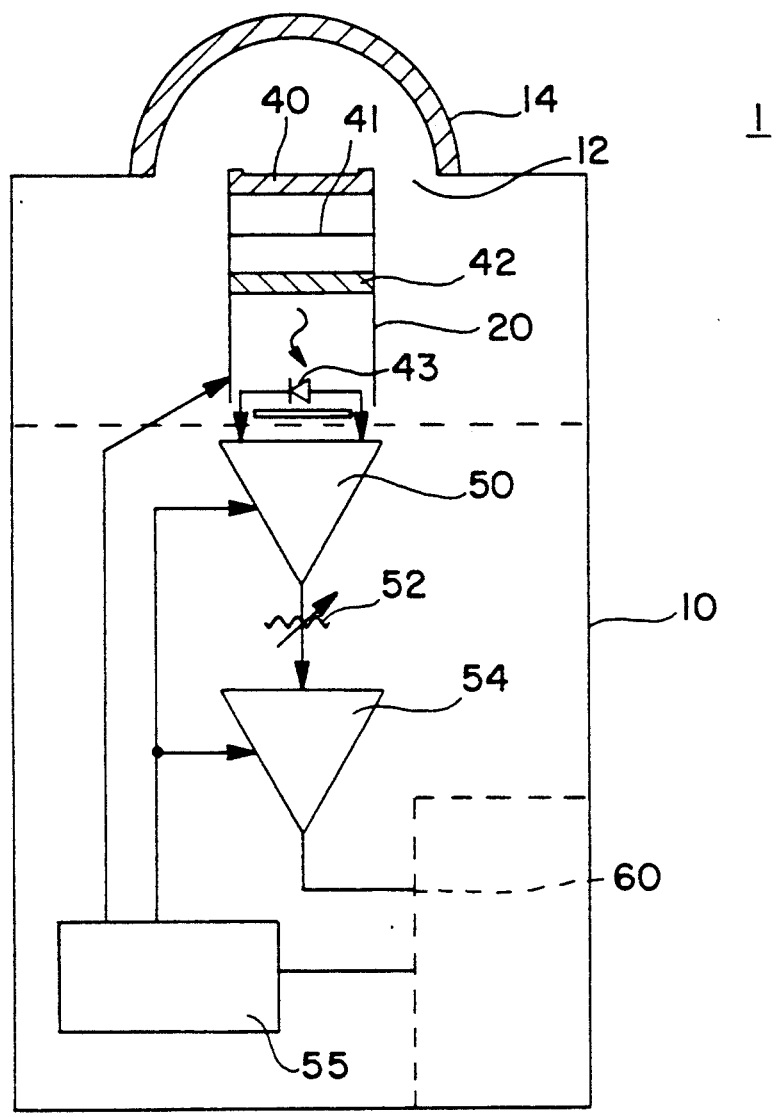
FIG. 1 is a mechanical and electrical block diagrammatic representation of a pyranometer constructed in accordance with the present invention.
Figure 2:
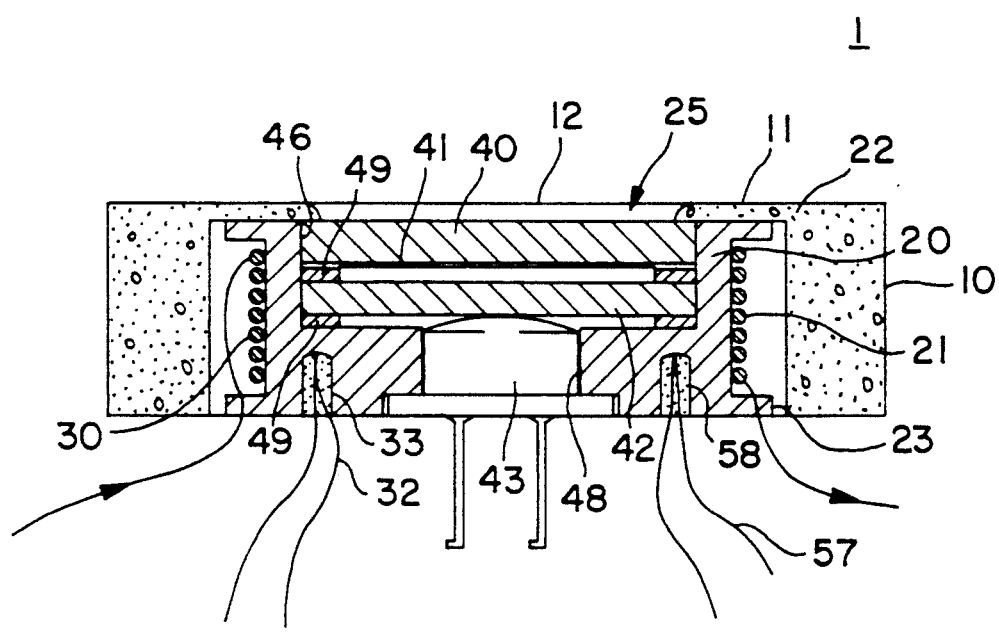
FIG. 2 is an elevation in cross sectional form of the embodiment of FIG. 1.
Figure 3:
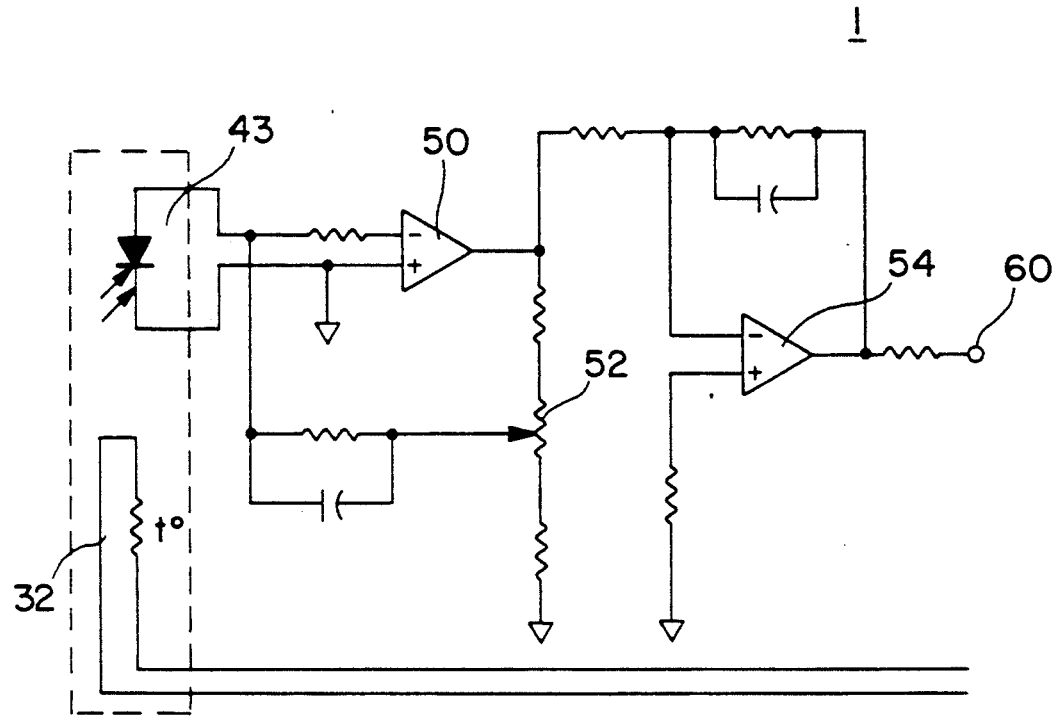
FIG. 3 is an electrical schematic diagram of an embodiment of the pyranometer of FIG. 1.

A pyranometer 1 constructed in accordance with the present invention is initially discussed with respect to FIGS. 1, 2 and 3, in which the same reference numerals are used to denote the same elements. FIG. 1 is a mechanical and electrical block diagrammatic representation, FIG. 2 is an elevation in cross sectional form, and FIG. 3 is an electrical schematic diagram. The pyranometer 1 is utilized for measuring UV-B in the preferred form, but could be configured as indicated below for UV-A measurement.

The pyranometer 1 is sealed in a housing 10. The housing 10 provides protection from weather. The housing 10 also provides thermal and electrical insulation. A suitable material for the housing 10 is Delrin, which has desirable insulating properties, is substantially chemically inert and has a low coefficient of thermal expansion. Most conveniently, the housing 10 is a right circular cylinder. The axial dimension of this cylinder defines, for purposes of orientation in description in the present specification, a vertical direction. An upper end of the housing 10 may comprise an inwardly extending annular flange 11 (FIG. 2) having a central aperture 12 which admits radiation to the interior of the housing 10. The flange 11 may support a dome 14. The dome 14 is hemispherical, and permits cosine response to radiation entering the aperture 12. The dome 14 is preferably of UV transmitting glass, such as WG-280, but may be replaced with quartz if it is desired to measure wavelengths shorter than 280 nm.

An aluminum bobbin 20 comprises a central cylinder 21 and outwardly extending upper and lower annular flanges 22 and 23 respectively. Aluminum provides a satisfactory combination of light weight, strength and heat conductivity. An upper portion of the cylinder 21 has a first chamber 25 having a larger inner diameter for receiving optically transmissive components described below. A lower portion of the bobbin has a second, smaller inner diameter for receiving a photodiode described below. An upper surface of the flange 22 is secured to a lower surface of the flange 11. A lower surface of the flange 22 preferably is in vertical registration with a lower surface of the housing 10. A heater 30, which is preferably a resistive foil heater 30, is positioned on an outer diameter of the bobbin 20 intermediate the upper and lower flanges 22 and 23. A temperature sensor 32, preferably a monitor thermistor 32 is mounted in a recess 33 in the lower portion of the bobbin 20. A variable parameter, here resistance, corresponds with the temperature in the bobbin 20, which will in turn be indicative of the temperature of components in the housing 10.

In optical series path from the aperture 12 are an ultraviolet pass filter 40, $MgWO_4$ phosphor 41, green filter 42 and GaAsP photodiode 43, each positioned vertically above the next. An upper portion of the bobbin 20 has a first bore 46 with an inner diameter preferably slightly larger than the aperture 12. The filter 40 with phosphor 41 thereon and the filter 42 are selected to have a diameter to fill the first bore 46. An lower portion of the bobbin 20 has a second bore 48 coaxially disposed and communicating with the bore 46. The bore 48 has an inner diameter for receiving the GaAsP photodiode 43. The GaAsP photodiode 43 is preferably housed in a TO-8 package. Spacer washers 49 retain that filters 40 and 42 in a fixed position between the lower surface of the flange 11 and the vertically lower portion of the bore 46. Since the radiation responsive receiver, i.e. the photodiode 43, the filters 40 and 42 may conveniently be only an inch (2.54 cm) in diameter. Consequently, cost is reduced compared to typical prior art embodiments requiring larger diameter filters.

The filter 40 is a UV-transmitting black glass, in the preferred form is a Schott UG-11 filter 1.6 mm thick. The filter 40 passes 80% of the incident UV-B light and blocks all but a small fraction of the visible light, primarily some red at about 750 nm. This mixture of UV-B and red transmitted through the filter 40 strikes the phosphor 41.

It is important that the phosphor 41 be positioned on the lower surface of the filter 40. A phosphor of $MgWO_4$ is preferred since significant prior data has been collected in the past using detectors responsive to emissions from $MgWO_4$ phosphors. The phosphor 41 absorbs UV-B and emits green light in response thereto. Other phosphors could be used, and this may eventually become preferred if a new standard procedure of calibrating UV-B detectors is developed in the future. The preferred deposition method is similar to phosphor deposition in a cathode ray tube. In accordance with the present invention, the thickness of the phosphor layer is carefully chosen. A thicker layer is most effective for absorbing incident UV-B light. A thinner layer is most effective for transmitting visible light. It has also been found in accordance with the present invention that the mean $MgWO_4$ particle diameter materially affects performance.

In accordance with the present invention, a preferred phosphor 41 has an areal density of 0.6 mg/cm$^2$ with a 4 $\mu$m or approximately 4 micron particle diameter. Increasing the phosphor thickness leads to a decrease in the efficiency of detecting UV light with shorter wavelengths relative to longer UV wavelengths. This shifts the effective excitation function curve toward longer wavelengths. Consequently, spectral response can be varied in correspondence with phosphor layer thickness. The phosphor deposition procedure provides for highly uniform layers from one pyranometer 1 to the next, and substantially uniform spectral response can be maintained.

In the preferred embodiment, the filter 42 is a 2.5 mm thick green glass filter such as a Corning 4010. The filter 42 blocks the red light transmitted by the filter 40 and passes the fluorescent light emitted by the phosphor 41. The intensity of the fluorescent light is measured by the detector 43, which is preferably a solid state GaAsP photodiode. An example of such a photodiode is the Hamamatsu G1117. These components are preferred for UV-B measurement, and me be altered for optimized response to UV-A.

It is significant the GaAsP is preferred because it is desirable that the pyranometer 1 be "solar blind." The peak response is at the green region and drops off rapidly at longer wavelengths. Prior art UV silicon detectors have relatively high response to red when measured at the levels of resolution at which the current pyranometer operates. This is significant because even a very small percentage response to the high level of visible red in sunlight will be material with respect to high resolution UV-B measurement.

The output of the detector 43 is coupled to a thermally stable transimpedance amplifier 50 providing an output coupled through a gain control potentiometer 52 to a line amplifier 54. The amplifier 50 raises the output current level of the photodiode 43. In the preferred form, the amplifier 54 provides a low impedance 0-5 volt dc output signal at an output terminal 60. The amplifiers 50 and 54 are supplied by a 12 volt source 55.

Figure 4:
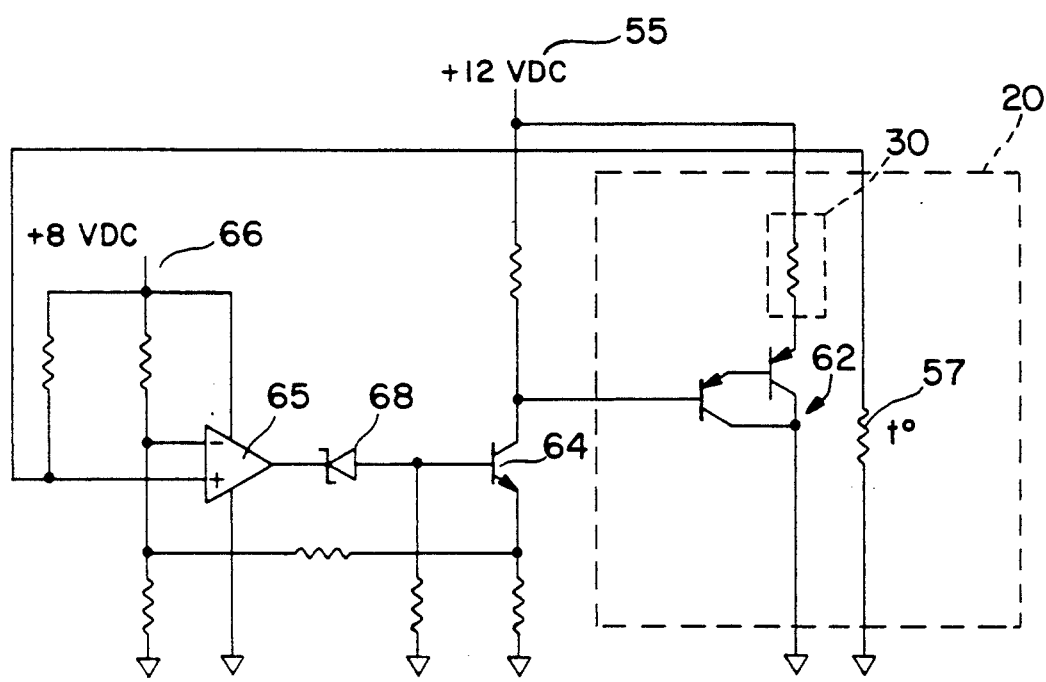
FIG. 4 is a schematic diagram of a thermal control circuit for the pyranometer constructed in accordance with the present invention.

The above-described components are inherently heat sensitive. To maintain the aluminum bobbin 20 at a preselected temperature, a control thermistor 57 (FIG. 2) is received in a bore 58. The control thermistor 57 is also illustrated in FIG. 4, which is a schematic diagram of a thermal regulation circuit for controlling the heater 30. The source 55 also is in series with the heater 30. Connection of power across the heater 30 is controlled by a Darlington transistor 62 having its emitter-collector circuit in series with the heater 30. A transistor 64 controls the supply of control voltage to the base of the transistor 62. The control thermistor 57 is connected to the non-inverting input of an operational amplifier 65 which is supplied by an 8 volt source 66 also coupled to the inverting input. As the value of the control thermistor 57 passes a predetermined level, the polarity of the output of the amplifier 65 changes, breaking down a Zener diode 68 connected to the base of the transistor 64 which compares the base potential to the collector potential to control level of potential applied to the base of the Darlington transistor 62, which in turn controls the potential across the heater 30.

Figure 5:
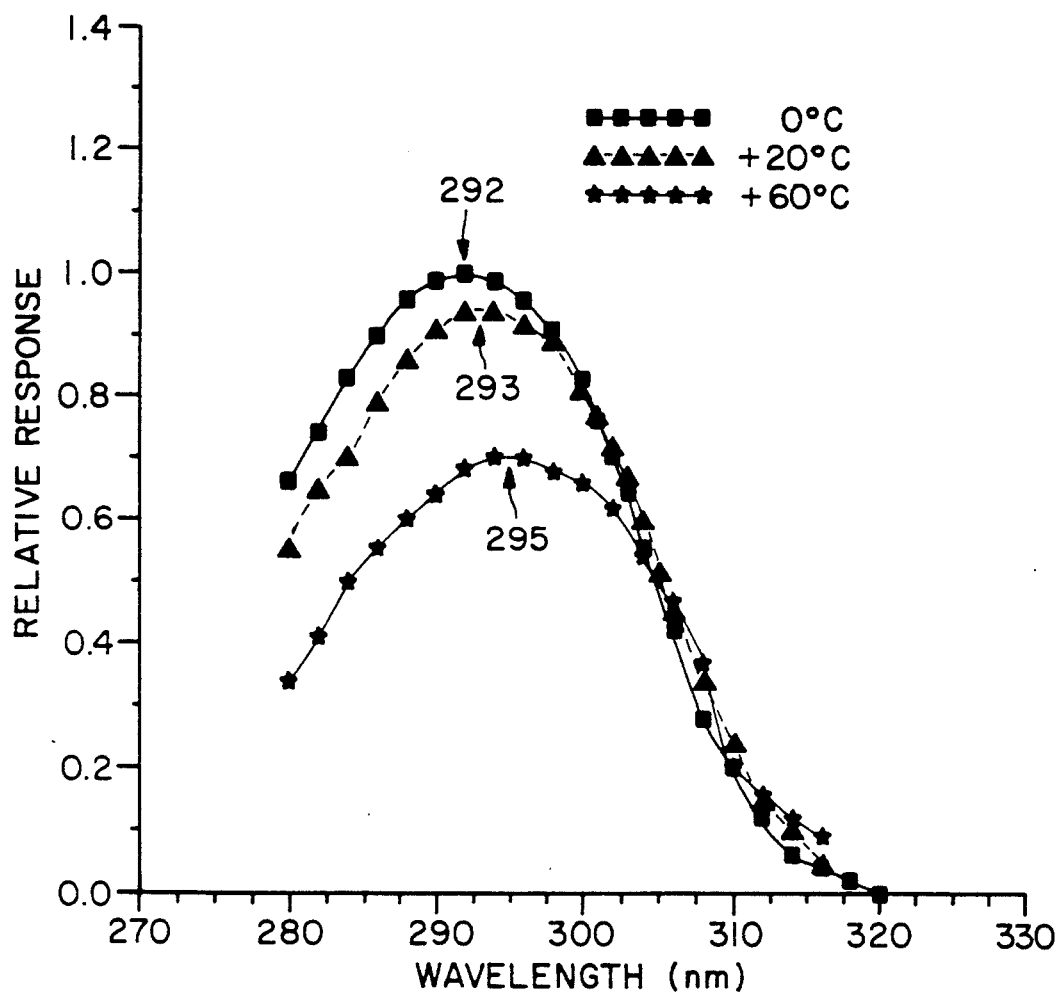
FIG. 5 is a graphic representation of the affect of temperature on response to UV-B.

In order to provide for stability of the circuit of FIG. 3 with respect to temperature, the circuit of FIG. 4 is used to maintain the aluminum bobbin 20 and photodetector 43 within the housing 10 at a temperature above foreseeable ambient temperature, for example 45° C. At a nominal ambient of 20° C., the housing temperature of 45° can be maintained with a power input to the heater 30 of about 1.3 W. The variation of relative response of a detector 43 in a pyranometer 1 with respect to temperature in the absence of temperature regulation is illustrated in FIG. 5. In this figure, the abscissa is wavelength, and the ordinate is relative amplitude for one solar source at each of three different temperatures. On each plot, the wavelength of peak response is noted.

Figure 6:
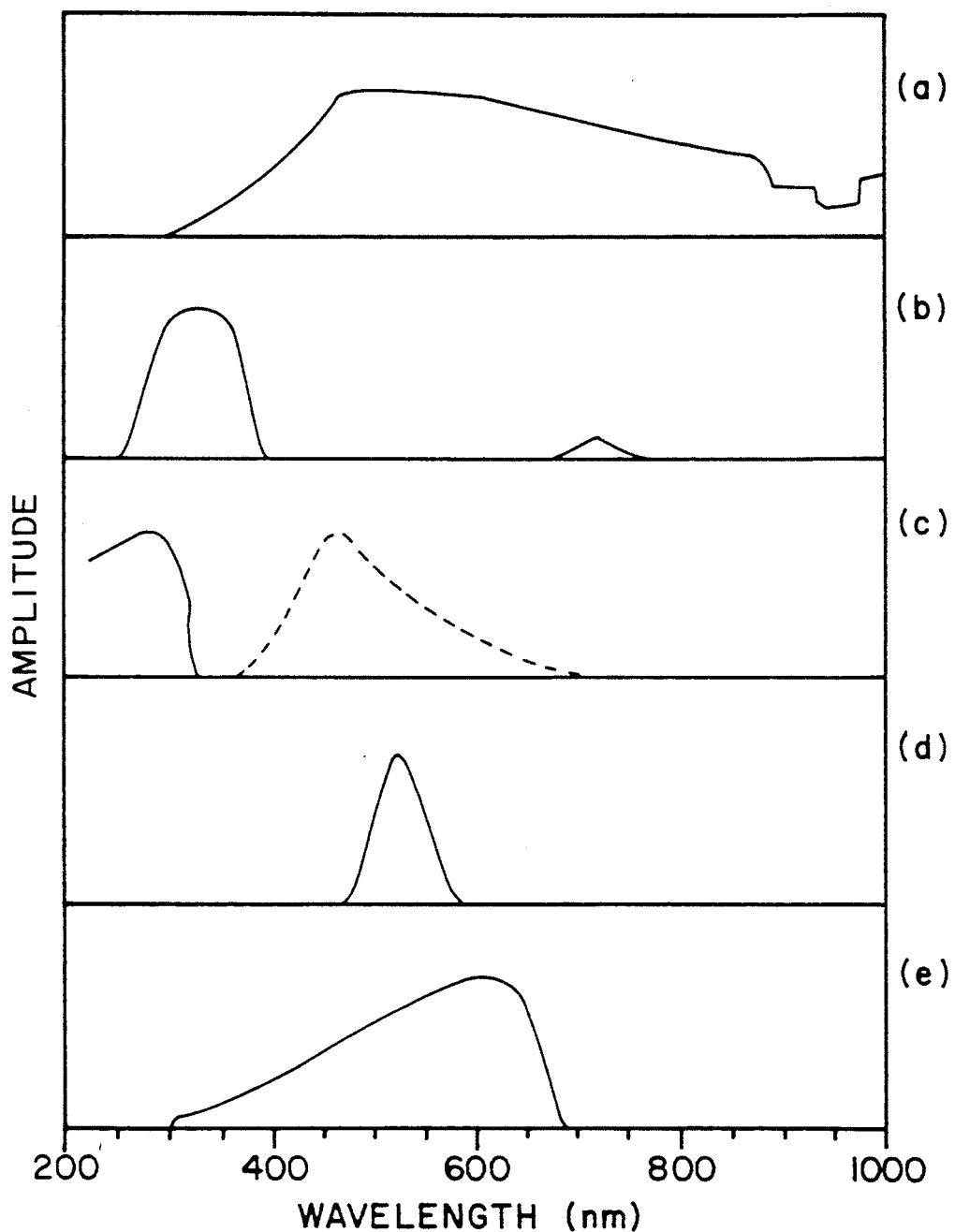
FIG. 6 is an illustration of intensity versus wavelength with a common abscissa for each of a plurality of elements of a detector constructed in accordance with a present invention.

FIG. 6 is an illustration of intensity versus wavelength on a common abscissa versus relative amplitude on the ordinate not to scale. FIG. 6a illustrates the distribution in a nominal solar source. FIG. 6b illustrates the passband of the UV filter 40. In FIG. 6c, the solid plot illustrates the absorption of the phosphor 41, and the dotted plot represents the emission of the phosphor 41. FIG. 6d illustrates the passband of the filter 42, and FIG. 6e illustrates the response of the detector 43. The relative responses of each optical stage provide for insensitivity to a small percentage of high intensity solar red light that may leak through the filter 40.

What is thus provided is a sensitive, reference grade, reproducible pyranometer. Those skilled in the art will be enabled to make many modifications to the specific embodiments disclosed herein to provide a pyranometer constructed in accordance with the present invention.

What is claimed as new and desired to be secured by Letters Patent of the United States is:

1. A pyranometer comprising, in combination: a housing means having a dome constructed of UV-transmissive material, a detector means including a UV-pass "black glass" filter for transmitting UV-B radiation, a phosphor layer for absorbing said UV-B radiation and reemitting visible radiation in a portion of the visible spectrum blocked by said "black glass" filter, a glass filter for passing light emitted by said phosphor and for blocking red light, a solid state photodiode receiving light from said phosphor, said solid state photodiode selected to have a peak response at a wavelength not longer than green, said response rapidly dropping off at longer wavelengths, for producing an output in correspondence with the intensity of UV-B radiation on said phosphor layer, whereby the pyranometer is solar blind, and thermal stabilization means for maintaining said detector means at a preselected temperature.

2. The pyranometer of claim 1 wherein said thermal stabilization means comprises a thermal mass surrounding said detector means, and further comprises means for thermally insulating said thermal mass from said housing means.

3. The pyranometer of claim 2 wherein said thermal stabilization means comprises heater means surrounding said thermal mass, for heating said thermal mass sensing means for sensing the temperature of said thermal mass and proportional control means responsive to said sensor means for regulating said heater means.

4. The pyranometer of claim 3 wherein the preselected temperature provided by said thermal stabilization means is selected to be above a temperature selected to correspond to ambient temperature.

5. The pyranometer of claim 4 wherein said phosphor is selected to have an approximate mean particle diameter of approximately 4 microns.

6. The pyranometer of claim 1 wherein said phosphor comprises $MgWO_4$ having areal density and mean particle diameter selected for optimal response to UV-B.

7. The pyranometer of claim 6 wherein said phosphor is selected to have an areal density of approximately 0.6 $mg/cm^2$.

8. The pyranometer of claim 7 wherein said phosphor is selected to have an approximate mean particle diameter of approximately 4 microns.

9. The pyranometer of claim 8 wherein said thermal stabilization means comprises a thermal mass surrounding said detector means, and further comprises means for thermally insulating said thermal mass from said housing means.

10. The pyranometer of claim 9 wherein said thermal stabilization means comprises heater means surrounding said thermal mass for heating said thermal mass, sensing means for sensing the temperature of said thermal mass and proportional control means responsive to said sensor means for regulating said heater means.

11. A pyranometer comprising, in combination: a housing means having a dome constructed of UV-transmissive material, a detector means including a UV-pass "black glass" filter for transmitting a selected UV band of radiation, a phosphor layer for absorbing radiation in the selected band and reemitting visible radiation in a portion of the visible spectrum blocked by said "black glass" filter, a glass for passing light emitted by said phosphor and for blocking red light, a solid state photodiode receiving light from said phosphor, said solid state photodiode selected to have a peak response at a wavelength not longer than green, said response rapidly dropping off at longer wavelengths, for producing an output in correspondence with the intensity of radiation in the selected band on said phosphor layer, whereby the pyranometer is solar blind, and thermal stabilization means for maintaining said detector means at a preselected temperature.

12. The pyranometer of claim 11 wherein said selected UV band is UV-A.

13. The pyranometer of claim 12 wherein said thermal stabilization means comprises a thermal mass surrounding said detector means, and further comprises means for thermally insulating said thermal mass from said housing means.

14. The pyranometer of claim 13 wherein said thermal stabilization means comprises heater means surrounding said thermal mass for heating said thermal mass, sensing means for sensing the temperature of said thermal mass and proportional control means responsive to said sensor means for regulating said heater means.

15. The pyranometer of claim 14 wherein the preselected temperature provided by said thermal stabilization means is selected to be above a temperature selected to correspond to ambient temperature.

16. The pyranometer of claim 15 wherein said phosphor is selected to have an approximate mean particle diameter of approximately 4 microns.

17. The pyranometer of claim 14 wherein said phosphor is selected to have an areal density of approximately 0.6 $mg/cm^2$.

18. The pyranometer of claim 17 wherein said phosphor is selected to have an approximate mean particle diameter of approximately 4 microns.

* * * * *